(12) United States Patent
Yang et al.

(10) Patent No.: US 10,331,197 B2
(45) Date of Patent: Jun. 25, 2019

(54) INTEGRATED CIRCUIT AND OPERATION METHOD OF THE SAME

(71) Applicant: Realtek Semiconductor Corporation, Hsinchu (TW)

(72) Inventors: Chih-Yuan Yang, New Taipei (TW); Wen-Hsia Kung, Taoyuan (TW); Chia-Fen Lin, Pingtung County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 13 days.

(21) Appl. No.: 15/857,841

(22) Filed: Dec. 29, 2017

(65) Prior Publication Data

US 2018/0188795 A1 Jul. 5, 2018

(30) Foreign Application Priority Data

Dec. 30, 2016 (TW) .............................. 105144274 A

(51) Int. Cl.
| | |
|---|---|
| G09G 5/00 | (2006.01) |
| G06F 1/3234 | (2019.01) |
| G09G 3/296 | (2013.01) |
| G06F 1/26 | (2006.01) |
| G09G 3/20 | (2006.01) |

(52) U.S. Cl.
CPC ............ *G06F 1/3265* (2013.01); *G06F 1/266* (2013.01); *G09G 3/2096* (2013.01); *G09G 3/296* (2013.01); *G09G 2330/021* (2013.01); *G09G 2330/028* (2013.01)

(58) Field of Classification Search
CPC ................. G09G 3/2096; G09G 3/296; G09G 2330/021; G09G 2330/028; G06F 1/32; G06F 1/266; G06F 1/3265
See application file for complete search history.

(56) References Cited

U.S. PATENT DOCUMENTS

| | | | | |
|---|---|---|---|---|
| 2013/0342515 | A1* | 12/2013 | Liu ........................ | G09G 3/003 345/204 |
| 2016/0109924 | A1* | 4/2016 | Nomura ................ | G06F 1/3287 327/535 |
| 2017/0048729 | A1* | 2/2017 | Jin ........................ | H04W 24/02 |
| 2017/0104359 | A1* | 4/2017 | Jung ....................... | H02J 7/025 |
| 2017/0133889 | A1* | 5/2017 | Yeo ........................ | H02J 50/80 |
| 2017/0223163 | A1* | 8/2017 | Li ........................ | H04M 1/7253 |
| 2017/0256973 | A1* | 9/2017 | Kim ...................... | H02J 7/0068 |

* cited by examiner

*Primary Examiner* — Joe H Cheng
(74) *Attorney, Agent, or Firm* — McClure, Qualey & Rodak, LLP

(57) ABSTRACT

A display controller disposed in a display device that includes a flash memory and an integrated circuit is provided. The flash memory stores display device information of the display device. The integrated circuit includes a first and a second power conversion circuit and an accessing circuit. The first power conversion circuit converts an external power received from an external power adapter to a power in a first power domain. The second power conversion circuit converts a host power received from a host to the power of a second power domain and outputs the power to a flash memory such that the flash memory operates accordingly. The accessing circuit operates according to the power of the second power domain to access and transmit the display device information from the flash memory to the host when the first power conversion circuit is not in operation.

20 Claims, 3 Drawing Sheets

INTEGRATED CIRCUIT AND OPERATION METHOD OF THE SAME

RELATED APPLICATIONS

This application claims priority to Taiwan Application Serial Number 105144274, filed Dec. 30, 2016, which is herein incorporated by reference.

BACKGROUND

Field of Invention

The present invention relates to a display technology. More particularly, the present invention relates to an integrated circuit and an operation method of the same.

Description of Related Art

When the host initializes, it is necessary to retrieve the display device information of the display device electrically coupled thereto to retrieve the type and the format of the display device. After retrieving the display device information, the host is able to provide the appropriate image signal according to the type and the format of the display device such that the display device generates the display frames. In some technologies, the host should be able to retrieve the correct display device information even when the power is not supplied to the display device through the power adapter. However, if the power is not appropriately configured in the display controller of the display device, the relating module can not receive enough power from the host. As a result, the display device information can not be retrieved accurately.

Accordingly, what is needed is an integrated circuit and an operation method of the same to address the issues mentioned above.

SUMMARY

The invention provides an integrated circuit disposed in a display device. The integrated circuit includes a first power conversion circuit, a second power conversion circuit, a processor and an accessing circuit. The first power conversion circuit is configured to convert an external power received from an external power adapter to a power in a first power domain. The second power conversion circuit is configured to convert a host power received from a host to the power of a second power domain and outputs the power of the second power domain to a flash memory that stores display device information related to a plurality of display standards, wherein the second power domain is electrically isolated with the first power domain. The processor is in communication with the flash memory. The accessing circuit is electrically coupled to the second power domain for receiving power for operation and is configured to only access the flash memory and transmit the display device information related to a selective one of the plurality of display standards to the host when the first power conversion circuit is not in operation.

Another aspect of the present invention is to provide a display controller disposed in a display device that includes a flash memory and an integrated circuit. The flash memory is configured to store display device information of the display device. The integrated circuit includes a first power conversion circuit, a second power conversion circuit, a processor and an accessing circuit. The first power conversion circuit is configured to convert an external power received from an external power adapter to a power in a first power domain. The second power conversion circuit is configured to convert a host power received from a host to the power of a second power domain and outputs the power of the second power domain to a flash memory that stores display device information related to a plurality of display standards, wherein the second power domain is electrically isolated with the first power domain. The processor is in communication with the flash memory. The accessing circuit is electrically coupled to the second power domain for receiving power for operation and is configured to only access the flash memory and transmit the display device information related to a selective one of the plurality of display standards to the host when the first power conversion circuit is not in operation.

Yet another aspect of the present invention is to provide an integrated circuit operation method used in an integrated circuit disposed in a display controller of a display device. The display controller includes a flash memory and the integrated circuit that includes a first power conversion circuit and a second power conversion circuit, in which the first power conversion circuit is configured to convert an external power received from an external power adapter to a power in a first power domain. The integrated circuit operation method includes the steps outlined below. A host power received from a host is converted to the power of a second power domain by the second power conversion circuit. The power of the second power domain is outputted to a flash memory that stores display device information related to a plurality of display standards by the second power conversion circuit, wherein the second power domain is electrically isolated with the first power domain. The power for operation is received by an accessing circuit electrically coupled to the second power domain to only access the flash memory when the first power conversion circuit is not in operation. The display device information related to a selective one of the plurality of display standards is transmitted by the accessing circuit to the host.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In order to make the objects, technical solutions and advantages of the present disclosure apparent, diagrams in combination of examples are used to describe the present disclosure in further detail. It should be understood that the specific embodiments described herein are merely examples for explaining the present disclosure and are not intended to limit the present disclosure.

Figure 1A:
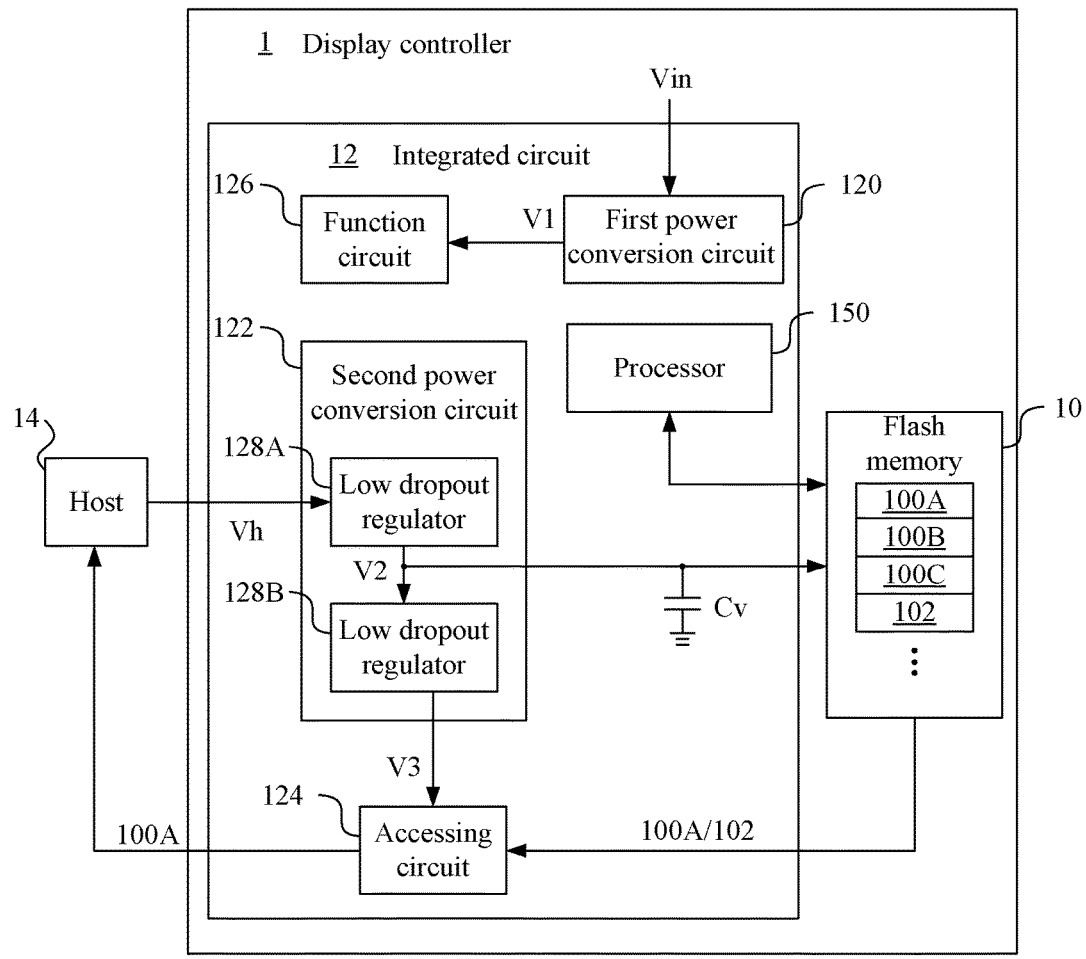
FIG. 1A is a block diagram of a display controller in an embodiment of the present invention.

Reference is now made to FIG. 1A. FIG. 1A is a block diagram of a display controller 1 in an embodiment of the present invention. The display controller 1 can be disposed in a display device (not illustrated). The display controller includes a flash memory 10 and an integrated circuit 12.

The flash memory 10 is configured to store display device information 100A-100C and commands 102 of the display device. In an embodiment, the display device information 100A-100C is related to a plurality of display standards, is extended display identification data (EDID) of the display standards respectively and includes such as, but not limited to information of display device resolution, manufacturer and serial number.

According to different types of transmission interface of the display device, the display device information 100A-100C can be the extended display identification data corresponding to video graphic array (VGA), digital visual interface (DVI) or high definition multimedia interface (HDMI). In other embodiments, the display device information 100A-100C may correspond to other types of the transmission interface and is not limited thereto.

The commands 102 include the commands to access the flash memory 10, such as but not limited to the actions to read and write and information of the initial addresses and the lengths of the memory sections.

The integrated circuit 12 includes a first power conversion circuit 120, a second power conversion circuit 122, an accessing circuit 124 and a processor 150.

The first power conversion circuit 120 is configured to convert an external power Vin received from an external power adapter (not illustrated) to a power in a first power domain. The first power conversion circuit 120 may include such as, but not limited to a low dropout regulator (LDO). The low dropout regulator can be a power converter to convert the power from a voltage of 3.3 volts to a voltage of 1 volt.

In an embodiment, there can be other power conversion circuits electrically coupled between the first power conversion circuit 120 and the external power adapter to convert the power of 12, 14 or 10 volts provided by the external power adapter to the external power Vin having the voltages of 3.3 volts first. Subsequently, the first power conversion circuit 120 converts the external power Vin to a first power V1 having the voltage of 1 volt.

The second power conversion circuit 122 is configured to convert a host power Vh received from a host 14 to the power of a second power domain. The second power domain is electrically isolated with the first power domain, such that when the first power conversion circuit 120 is not in operation (e.g. the external power adapter is not providing any power and thus first power V1 is 0 volt), the power of the second power domain is not pulled to 0 volt as well. In an embodiment, the host power Vh has a voltage of 5 volts. The second power conversion circuit 122 may include two low dropout regulators 128A and 128B.

In an embodiment, the low dropout regulator 128A is a power converter to convert the power from a voltage of 5 volts to a voltage of 3.3 volts. As a result, the host power Vh of 5 volts is converted to a second power V2 of 3.3 volts. The low dropout regulator 128A further outputs the second power V2 to the flash memory 10 such that the flash memory 10 operates according to the second power V2. In an embodiment, a transmission path that the low dropout regulator 128A transmits the second power V2 to the flash memory 10 may include a voltage-stabilizing capacitor Cv.

In an embodiment, the low dropout regulator 128B is a power converter to convert the power from a voltage of 3.3 volts to a voltage of 1 volt. As a result, the second power V2 of 3.3 volts is converted to a third power V3 of 1 volt.

It is appreciated that the configuration of the power conversion circuits and the voltage levels of the input and output powers described above are merely an example. In other embodiments, the power conversion circuit can be implemented by other configurations. The voltage levels of the input and output powers and the number of the input and output powers can be different as well.

The accessing circuit 124 may be a module that includes circuits such as, but not limited to a reference voltage circuit, a clock circuit, a register circuit, an oscillating circuit (not illustrated) to access the flash memory 10. The accessing circuit 124 is electrically coupled to the second power domain for receiving power for operation. More specifically, the accessing circuit 124 is configured to operate according to the third power V3 generated by the second power conversion circuit 122 when the first power conversion circuit 120 is not in operation.

The processor 150 is in communication with the flash memory 10. The processor 150 may be a general purpose processor such as a graphics processing unit (GPU), a digital signal processor (DSP), or a central processing unit (CPU).

In an embodiment, when the accessing circuit 124 is in operation, the accessing circuit 124 is only configured to access the flash memory 10 through such as, but not limited to a serial peripheral interface (SPI). For example, the accessing circuit 124 can access the commands 102 in the flash memory 10 and access the display device information 100A-100C having the corresponding address in the flash memory 10 based on the content of the commands 102. Further, the accessing circuit 124 stores the accessed display device information 100A-100C in an internal storage module such as, but not limited to a random access memory (not illustrated). For example, when the display device and the host 14 are coupled through the interface of video graphic array, the accessing circuit 124 can access the corresponding address and the data length of the data in the flash memory 10 according to the commands 102 related to the video graphic array after the commands 102 are accessed. Subsequently, the corresponding display device information 100A is retrieved.

Further, the accessing circuit 124 communicates with the host 14 through such as, but not limited to a display data channel to transmit the retrieved display device information 100A related to one of the display standards to the host 14.

In some approaches, the power domains of powers from the external power adapter and the host 14 are not independent. When an over-voltage protection mechanism is disposed in the power circuit corresponding to the external power adapter in the display controller. When the external power adapter is not in operation such that the power is provided only by the host 14, such a mechanism is easy to be triggered. Therefore, the flash memory 10 is not able to obtain enough power.

As a result, for the display controller 1 of the present invention, the flash memory 10 and the accessing circuit 124 of the integrated circuit 12 can operate according to the power in an independent power domain converted according to the power Vh from the host 14 when the external power adapter does not supply the power. The accessing circuit 124 is able to access and transmit the correct display device information 100A-100C from the flash memory 10 to the host 14.

Further, for the display controller 1 of the present invention, since the commands 102 are stored in the flash memory 10 and are accessed by the accessing circuit 124 before other processing circuits, e.g. the processor 150, can. This is due to the accessing circuit 124 being a hardware dedicated for accessing the display device information, while the other processing circuits, e.g. the processor 150, typically operate software (which would take longer than dedicated hardware) to perform the data accessing for the display device information. As a result, the display device information 100A-100C having the corresponding address in the flash memory 10 can be accessed by the accessing circuit 124 according to the content of the commands 102. In an implementation example, the time for the accessing circuit 124 to access the display device information 100A-100C takes only 0.5 milliseconds and thus the accessing speed is greatly increased.

Figure 1B:
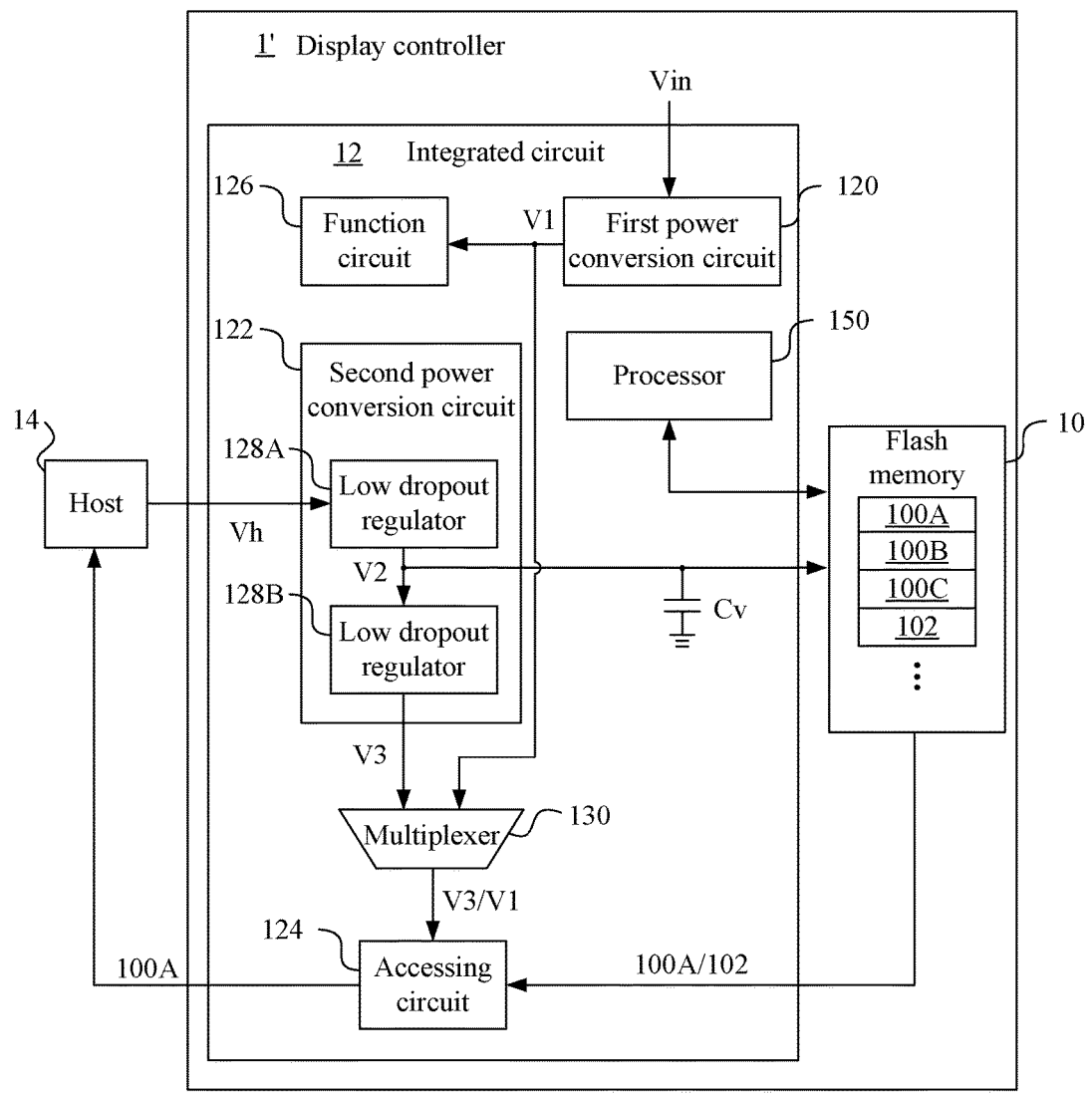
FIG. 1B is a block diagram of a display controller in an embodiment of the present invention.

Reference is now made to FIG. 1B. FIG. 1B is a block diagram of a display controller 1' in an embodiment of the present invention. The components of the display controller 1' in FIG. 1B is similar to those in the display controller 1 in FIG. 1A. As a result, the detail of identical components in FIG. 1A and FIG. 1B is not described herein.

Compared to FIG. 1A, the integrated circuit 12 of the display controller 1' in FIG. 1B further includes a multiplexer 130 electrically coupled to the first power conversion circuit 120 and the low dropout regulator 128B of the second power conversion circuit 122.

The multiplexer 130 outputs the third power V3 to the accessing circuit 124 when the first power conversion circuit 120 is not in operation such that the accessing circuit 124 operates according to the third power V3. When the first power conversion circuit 120 starts to be in operation and generates the first power V1, the multiplexer 130 outputs the first power V1 to the accessing circuit 124 such that the accessing circuit 124 operates according to the first power V1.

In actual operating condition, a voltage different may exist between the first power V1 in the first domain and the third power V3 in the second power domain since the first power V1 and the third power V3 may not equal to exact 1 volt. For example, due to the difference of the manufacturing process between the first power conversion circuit 120 and the second power conversion circuit 122, the first power V1 and the third power V3 generated therefrom maybe 1.02 volts and 10.5 volts respectively.

When a signal transmission is performed with the accessing circuit 124 by the other circuits in the integrated circuit 12 such as the function circuit 126, the voltage level of the transmitted signal becomes inaccurate due to the voltage difference between the first voltage V1 and the third voltage V3. As a result, after the first power conversion circuit 120 starts to operate, the accessing circuit 124 can operate according to the first power V1 due to the disposition of the multiplexer 130 in order to perform signal transmission with other circuits in the integrated circuit 12.

Figure 2:
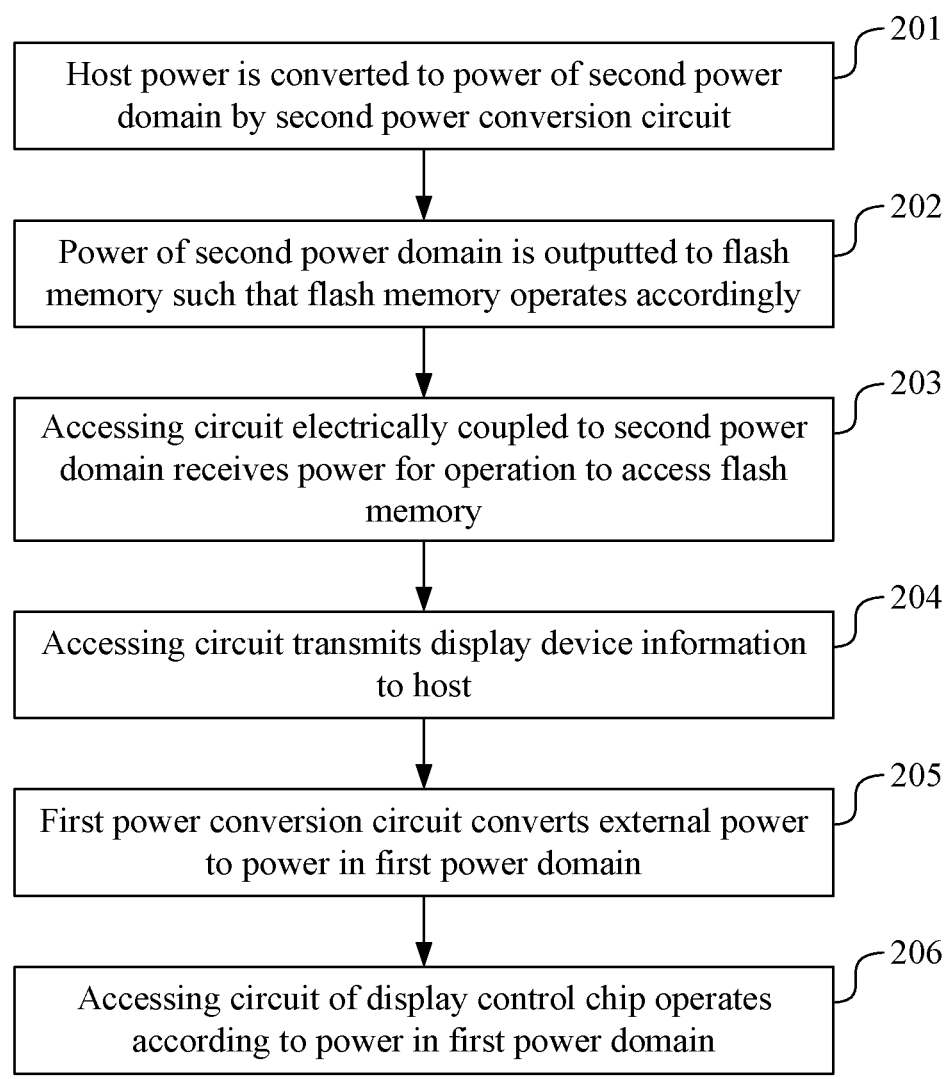
FIG. 2 is a flow chart of an integrated circuit operation method in an embodiment of the present invention.

Reference is now made to FIG. 2. FIG. 2 is a flow chart of an integrated circuit operation method 200 in an embodiment of the present invention. The integrated circuit operation method 200 can be used in the integrated circuit 12 of the display controller 1 illustrated in FIG. 1A. The integrated circuit operation method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the host power Vh is converted to the power of the second power domain by the second power conversion circuit 122. In an embodiment, the power in the second power domain includes the second power V2 and the third power V3.

In step 202, the power of the second power domain, such as but not limited the second power V2, is outputted to the flash memory 10 by the second power conversion circuit 122 such that the flash memory 10 operates accordingly.

In step 203, the accessing circuit 124 electrically coupled to the second power domain receives power for operation, such as but not limited to the third power V3, to only access the flash memory 10.

In step 204, the accessing circuit 124 transmits the display device information 100A to the host 14.

In step 205, the first power conversion circuit 120 converts the external power Vin to the power in the first power domain. In an embodiment, the power in the first power domain includes the first power V1.

In step 206, according to the switching of the multiplexer 130, the accessing circuit 124 of the integrated circuit 12 operates according to the power in the first power domain, such as but not limited to the first power V1.

It is appreciated that the steps 205 and 206 can be performed selectively after the first power conversion circuit 120 starts to operate. In other embodiments, the present invention can be implemented without performing the steps 205 and 206.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An integrated circuit disposed in a display device, wherein the integrated circuit comprises:
   a first power conversion circuit configured to convert an external power received from an external power adapter to a power in a first power domain;
   a second power conversion circuit configured to convert a host power received from a host to the power of a second power domain and outputs the power of the second power domain to a flash memory that stores display device information related to a plurality of display standards, wherein the second power domain is electrically isolated with the first power domain;
   a processor in communication with the flash memory; and
   an accessing circuit electrically coupled to the second power domain for receiving power for operation, and configured to only access the flash memory and transmit the display device information related to a selective one of the plurality of display standards to the host when the first power conversion circuit is not in operation.

2. The integrated circuit of claim 1, wherein the first power conversion circuit is configured to generates a first power in the first power domain, and the second power conversion circuit comprises two low dropout regulators configured to generate a second power and a third power in the second power domain respectively, wherein the first power and the third power have substantially a same voltage level, and the voltage level of the second power is larger than the voltage level of the first power and the third power;
   wherein the second power conversion circuit transmits the second power to the flash memory such that the flash memory operates according to the second power, and the accessing circuit operates according to the third power.

3. The integrated circuit of claim 2, further comprising a multiplexer electrically coupled to the first power conversion circuit and the second power conversion circuit;
   wherein the multiplexer outputs the third power to the accessing circuit when the first power conversion circuit is not in operation such that the accessing circuit operates according to the third power; and
   the multiplexer outputs the first power to the accessing circuit when the first power conversion circuit is in operation such that the accessing circuit operates according to the first power.

4. The integrated circuit of claim 2, further comprising a transmission path that the second power conversion circuit uses to transmit the second power to the flash memory, wherein the transmission path comprises a voltage-stabilizing capacitor.

5. The integrated circuit of claim 1, wherein the flash memory is further configured to store a command, wherein the accessing circuit is configured to access the command and access the display device information in the flash memory according to the command.

6. The integrated circuit of claim 5, wherein the accessing circuit, according to a type of a transmission interface between the display device and the host, further accesses the display device information in the flash memory corresponding to the type of the transmission interface.

7. The integrated circuit of claim 1, wherein the accessing circuit accesses the flash memory through a serial peripheral interface (SPI).

8. The integrated circuit of claim 1, wherein the accessing circuit transmits the display device information to the host through a display data channel (DDC).

9. A display controller disposed in a display device comprising:
   a flash memory that stores display device information of the display device related to a plurality of display standards; and
   an integrated circuit comprising:
      a first power conversion circuit configured to convert an external power received from an external power adapter to a power in a first power domain;
      a second power conversion circuit configured to convert a host power received from a host to the power of a second power domain and outputs the power of the second power domain to the flash memory, wherein the second power domain is electrically isolated with the first power domain;
      a processor in communication with the flash memory; and
      an accessing circuit electrically coupled to the second power domain for receiving power for operation, and configured to only access the flash memory and transmit the display device information related to a selective one of the plurality of display standards to the host when the first power conversion circuit is not in operation.

10. The display controller of claim 9, wherein the first power conversion circuit is configured to generates a first power in the first power domain, and the second power conversion circuit comprises two low dropout regulators configured to generate a second power and a third power in the second power domain respectively, wherein the first power and the third power have substantially a same voltage level, and the voltage level of the second power is larger than the voltage level of the first power and the third power;
   wherein the second power conversion circuit transmits the second power to the flash memory such that the flash memory operates according to the second power, and the accessing circuit operates according to the third power.

11. The display controller of claim 10, wherein the integrated circuit further comprises a multiplexer electrically coupled to the first power conversion circuit and the second power conversion circuit;
   wherein the multiplexer outputs the third power to the accessing circuit when the first power conversion circuit is not in operation such that the accessing circuit operates according to the third power; and
   the multiplexer outputs the first power to the accessing circuit when the first power conversion circuit is in operation such that the accessing circuit operates according to the first power.

12. The display controller of claim 10, wherein the integrated circuit further comprises a transmission path that the second power conversion circuit uses to transmit the second power to the flash memory, wherein the transmission path comprises a voltage-stabilizing capacitor.

13. The display controller of claim 9, wherein the flash memory is further configured to store a command, wherein the accessing circuit is configured to access the command and access the display device information in the flash memory according to the command.

14. The display controller of claim 13, wherein the accessing circuit, according to a type of a transmission interface between the display device and the host, further accesses the display device information in the flash memory corresponding to the type of the transmission interface.

15. The display controller of claim 9, wherein the accessing circuit accesses the flash memory through a serial peripheral interface, and the accessing circuit transmits the display device information to the host through a display data channel.

16. An integrated circuit operation method used in an integrated circuit disposed in a display device, wherein the display controller comprises a flash memory that stores display device information related to a plurality of display standards and the integrated circuit that comprises a first power conversion circuit and a second power conversion circuit, in which the first power conversion circuit is configured to convert an external power received from an external power adapter to a power in a first power domain, the integrated circuit operation method comprising:
   converting a host power received from a host to the power of a second power domain by the second power conversion circuit;
   outputting the power of the second power domain to the flash memory by the second power conversion circuit, wherein the second power domain is electrically isolated with the first power domain;
   receiving power for operation by an accessing circuit configured to only access the flash memory and electrically coupled to the second power domain when the first power conversion circuit is not in operation; and
   transmitting the display device information related to a selective one of the plurality of display standards by the accessing circuit to the host.

17. The integrated circuit operation method of claim 16, further comprising:
   generating a first power in the first power domain by the first power conversion circuit;

generating a second power and a third power in the second power domain respectively by two low dropout regulators comprised in the second power conversion circuit, wherein the first power and the third power have substantially a same voltage level, and the voltage level of the second power is larger than the voltage level of the first power and the third power;

transmitting the second power to the flash memory by the second power conversion circuit such that the flash memory operates according to the second power, and the accessing circuit operates according to the third power.

18. The integrated circuit operation method of claim 17, wherein the integrated circuit further comprises a multiplexer electrically coupled to the first power conversion circuit and the second power conversion circuit, the integrated circuit operation method further comprises:

outputting the third power to the accessing circuit by the multiplexer when the first power conversion circuit is not in operation such that the accessing circuit operates according to the third power; and outputting the first power to the accessing circuit by the multiplexer when the first power conversion circuit is in operation such that the accessing circuit operates according to the first power.

19. The integrated circuit operation method of claim 16, wherein the flash memory is further configured to store a command, the integrated circuit operation method further comprises:

accessing the command by the accessing circuit; and accessing the display device information in the flash memory according to the command by the accessing circuit.

20. The integrated circuit operation method of claim 19, further comprising:

according to a type of a transmission interface between the display device and the host, accessing the display device information in the flash memory corresponding to the type of the transmission interface by the accessing circuit.

* * * * *